United States Patent
Nakamura

(10) Patent No.: US 9,983,075 B2
(45) Date of Patent: *May 29, 2018

(54) MAGNETOSTRICTIVE TORQUE SENSOR THAT PREVENTS TORQUE MEASUREMENT ERROR DUE TO OFFSET VOLTAGE

(71) Applicant: Hitachi Metals, Ltd., Tokyo (JP)

(72) Inventor: Teruyuki Nakamura, Hitachi (JP)

(73) Assignee: HITACHI METALS, LTD, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/471,057

(22) Filed: Mar. 28, 2017

(65) Prior Publication Data

US 2017/0284877 A1    Oct. 5, 2017

(30) Foreign Application Priority Data

Apr. 1, 2016  (JP) ................................. 2016-074090

(51) Int. Cl.
  *G01L 3/10*  (2006.01)
(52) U.S. Cl.
  CPC .................................... *G01L 3/102* (2013.01)
(58) Field of Classification Search
  CPC ................ G01L 3/02; G01L 3/00; G01L 3/10
  USPC ....................... 73/862.325, 862.331–862.338
  See application file for complete search history.

(56) References Cited

U.S. PATENT DOCUMENTS

| 4,538,083 | A | * | 8/1985 | Nozawa | H02K 3/04 310/198 |
| 5,442,966 | A | * | 8/1995 | Hase | G01L 3/102 73/862.333 |
| 6,823,746 | B2 | * | 11/2004 | Viola | G01L 3/102 73/862.335 |
| 7,762,148 | B2 | * | 7/2010 | Shimizu | B62D 6/10 73/862.331 |

FOREIGN PATENT DOCUMENTS

JP      2008-089305 A      4/2008

* cited by examiner

Primary Examiner — Harshad R Patel
Assistant Examiner — Octavia Hollington
(74) Attorney, Agent, or Firm — Thomas W. Cole; Roberts Mlotkowski Safran Cole & Calderon, P.C.

(57) ABSTRACT

A torque sensor includes a bobbin that includes a plurality of first inclined guide paths inclined at a predetermined angle relative to an axial direction and a second inclined guide paths inclined at a predetermined angle relative to the axial direction in a direction opposite, first and fourth detection coils formed by winding insulated wires around the bobbin along the first inclined guide paths, and second and third detection coils formed by winding insulated wires around the bobbin along the second inclined guide paths. The first to fourth detection coils each form a plurality of layers laminated on the outer surface of the bobbin. The layers of the second and third detection coils are interposed between the plurality of layers of the first and fourth detection coils. The layers of the first and fourth detection coils are interposed between the plurality of layers of the second and third detection coil.

8 Claims, 6 Drawing Sheets ial No. 2016-074090 filed on Apr. 1, 2016, the

MAGNETOSTRICTIVE TORQUE SENSOR THAT PREVENTS TORQUE MEASUREMENT ERROR DUE TO OFFSET VOLTAGE

The present application is based on Japanese patent application No. 2016-074090 filed on Apr. 1, 2016, the entire contents of which are incorporated herein by reference.

BACKGROUND OF THE INVENTION

1. Field of the Invention

The invention relates to a magnetostrictive torque sensor.

2. Description of the Related Art

Known magnetostrictive torque sensors are used on a magnetostrictive rotating shaft with magnetic permeability varying according to applied stress, and are configured such that a variation in magnetic permeability of the rotating shaft when distorted under the applied torque is detected as variation in inductance of a detection coil, thereby detecting a torque applied to the rotating shaft.

When torque is applied to the rotating shaft, compressive (or tensile) stress acts in a direction inclined at a predetermined angle (e.g., +45 degrees) relative to an axial direction and tensile (or compressive) stress acts in a direction inclined at a predetermined angle in the opposite direction (e.g., −45 degrees) relative to the axial direction. Therefore, when the torque sensor is configured that variations in magnetic permeability in the directions inclined at, e.g., +45 degrees and −45 degrees relative to the axial direction are respectively detected by two detection coils and a difference in voltage between two ends is measured on the both detection coils by using a bridge circuit, etc., torque applied to the rotating shaft can be detected at high sensitivity.

Also, a torque sensor has been proposed in which a +45°-detection coil inclined at +45° relative to the axial direction is provided as a first layer, a −45°-detection coil inclined at −45° relative to the axial direction is provided as a second layer, another +45°-detection coil inclined at +45° relative to the axial direction is provided as a third layer, another −45°-detection coil inclined at −45° relative to the axial direction is provided as a fourth layer, and the first to fourth layers are arranged in this order from the rotating shaft side toward the outside (see JP-B-4888015).

In this torque sensor, torque applied to the rotating shaft is measured using a bridge circuit in which the two +45°-detection coils are arranged on a pair of opposite sides and the two −45°-detection coils are arranged on another pair of opposite sides.

SUMMARY OF THE INVENTION

The prior-art torque sensors are configured such that the layer diameter increases from the inner layer to the outer layer, and therefore they have a tendency that the layer closer to the outside has higher inductance and resistance (DC resistance) due to the diameter difference. Thus, voltage (offset voltage) is output from the bridge circuit even when torque is not applied. The offset voltage varies according to temperature since the resistive component of the coil has temperature dependence. The offset voltage may cause an error in torque measurement.

It is an object of the invention to provide a torque sensor that prevents the error in torque measurement due to the offset voltage.

According to an embodiment of the invention, a torque sensor for being attached around a magnetostrictive rotating shaft to measure torque applied to the rotating shaft, the torque sensor comprises:

a non-magnetic bobbin that is provided coaxially with and at a distance from the rotating shaft, is formed into a hollow cylindrical shape, and comprises a plurality of first inclined guide paths and a plurality of second inclined guide paths on the outer peripheral surface, the first inclined guide paths being inclined at a predetermined angle relative to an axial direction and the second inclined guide paths being inclined at the predetermined angle relative to the axial direction in a direction opposite to the first inclined guide paths;

first and fourth detection coils formed by winding insulated wires around the bobbin along the first inclined guide paths; and second and third detection coils formed by winding insulated wires around the bobbin along the second inclined guide paths, wherein the first to fourth detection coils each form a plurality of layers laminated on the outer surface of the bobbin, and a bridge circuit is formed by annularly connecting the first detection coil, the second detection coil, the fourth detection coil and the third detection coil in this order, wherein the layers of the second and third detection coils are interposed between the plurality of layers of the first detection coil, wherein the layers of the first and fourth detection coils are interposed between the plurality of layers of the second detection coil, wherein the layers of the first and fourth detection coils are interposed between the plurality of layers of the third detection coil, and wherein the layers of the second and third detection coils are interposed between the plurality of layers of the fourth detection coil.

Effects of the Invention

According to an embodiment of the invention, a torque sensor can be provided that prevents the error in torque measurement due to the offset voltage.

BRIEF DESCRIPTION OF THE DRAWINGS

Next, the present invention will be explained in more detail in conjunction with appended drawings, wherein:

FIGS. 1A and 1B are diagrams illustrating a torque sensor in the first embodiment of the present invention, wherein FIG. 1A is an exploded perspective view and FIG. 1B is a cross sectional view when attached to a rotating shaft;

FIGS. 3A and 3B are schematic exploded plan views showing the bobbin, wherein FIG. 3A is an explanatory diagram illustrating how to wind insulated wires to form first and fourth detection coils and FIG. 3B is an explanatory diagram illustrating how to wind insulated wires to form second and third detection coils;

FIGS. 5A to 5D are schematic exploded plan views showing a bobbin in the second embodiment of the invention, wherein FIG. 5A is an explanatory diagram illustrating how to wind an insulated wire to form the first detection coil, FIG. 5B is an explanatory diagram illustrating how to wind an insulated wire to form the second detection coil, FIG. 5C is an explanatory diagram illustrating how to wind an insulated wire to form the third detection coil and FIG. 5D is an explanatory diagram illustrating how to wind an insulated wire to form the fourth detection coil; and FIGS. 6A and 6B are schematic exploded plan views showing a bobbin in the third embodiment of the invention, wherein FIG. 6A is an explanatory diagram illustrating how to wind insulated wires to form the first and fourth detection coils and FIG. 6B is an explanatory diagram illustrating how to wind insulated wires to form the second and third detection coils.

DETAILED DESCRIPTION OF THE PREFERRED EMBODIMENTS

First Embodiment

The first embodiment of the invention will be described in conjunction with the FIGS. 1A to 4.

General Configuration of Torque Sensor

Figure 1A:
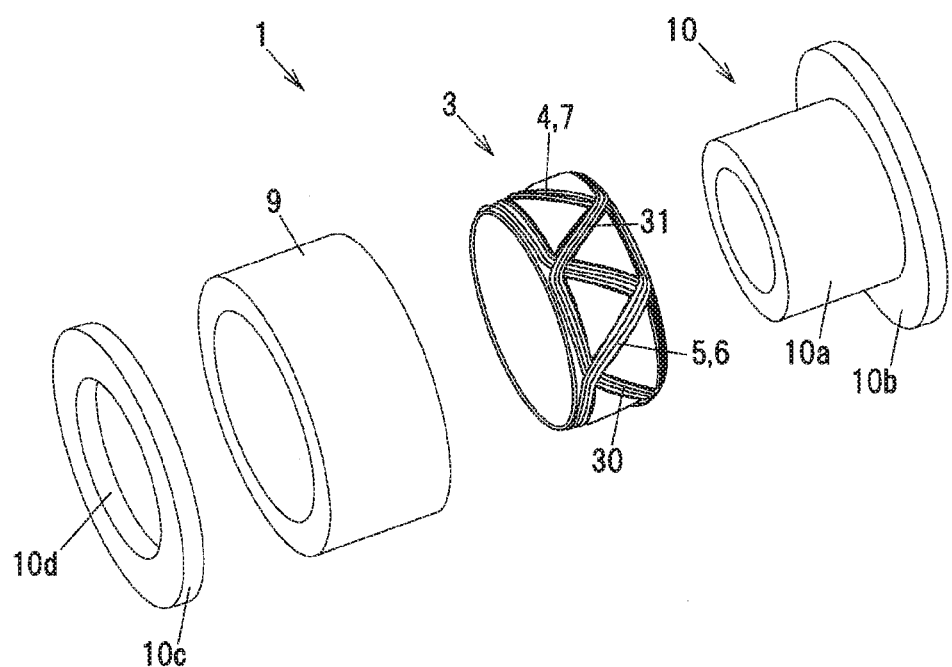
Figure 1B:
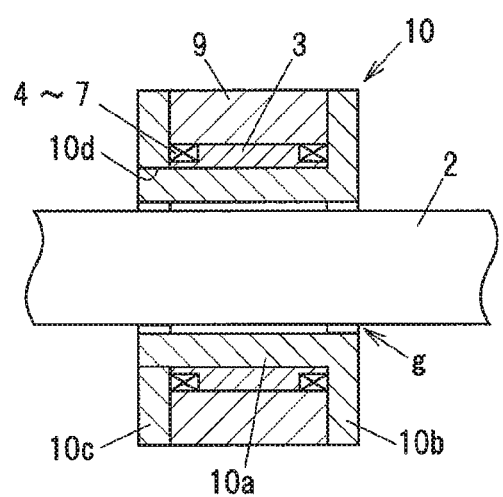

FIGS. 1A and 1B are diagrams illustrating a torque sensor in the first embodiment of the invention, wherein FIG. 1A is an exploded perspective view and FIG. 1B is a cross sectional view when attached to a rotating shaft As shown in FIGS. 1A and 1B, a torque sensor 1 is attached around a magnetostrictive rotating shaft 2 to measure torque (rotational torque) applied to the rotating shaft 2.

The torque sensor 1 is provided with a bobbin 3 formed of a resin which is a non-magnetic material, first, second, third and fourth detection coils 4, 5, 6 and 7 formed by winding insulated wires 8 around the bobbin 3, a magnetic ring 9 and a fixing ring 10.

The rotating shaft 2 is formed of a magnetostrictive material and has a columnar shape (bar shape). Examples of the magnetostrictive material include nickel, an iron-aluminum alloy and an iron-cobalt alloy, etc. The material used to form the rotating shaft 2 may be either a positive magnetostrictive material of which magnetic permeability decreases under compression and increases under tension, or a negative magnetostrictive material of which magnetic permeability increases under compression and decreases under tension. The rotating shaft 2 is, e.g., a shaft used to transfer torque in a powertrain system in a vehicle, or a shaft used to transfer torque of engine in a vehicle.

The magnetic ring 9 is formed of a magnetic material (ferromagnetic material) and is formed into a hollow cylindrical shape. The bobbin 3 with the first to fourth detection coils 4 to 7 wound thereon is inserted into the hollow of the magnetic ring 9. The magnetic ring 9 is formed so that an inner diameter thereof is substantially the same as (but slightly larger than) an outer diameter of the bobbin 3. The magnetic ring 9 serves to prevent a magnetic flux generated by the first to fourth detection coils 4 to 7 from leaking to the outside and thereby to suppress a decrease in sensitivity.

The fixing ring 10 is used to fix the bobbin 3 to the magnetic ring 9, and is provided with a hollow cylinder 10a to be inserted into the hollow of the bobbin 3, a first annular flange 10b integrally provided at an end portion of the cylinder 10a, and a second annular flange 10c having an insertion hole 10d into which another end portion of the cylinder 10a is inserted and fitted.

The bobbin 3 is inserted into the hollow of the magnetic ring 9. Then, the cylinder 10a of the fixing ring 10 is inserted into the hollow of the bobbin 3. Then, a front end portion (the other end portion) of the cylinder 10a is inserted into the insertion hole 10d and is fitted to the second flange 10c. Accordingly, the magnetic ring 9 and the bobbin 3 are sandwiched between the two flanges 10b and 10c and the bobbin 3 is also sandwiched between the outer peripheral surface of the cylinder 10a and the inner peripheral surface of the magnetic ring 9. The bobbin 3 is thereby fixed to the magnetic ring 9.

The cylinder 10a is formed so that an outer diameter thereof is substantially the same as (but slightly smaller than) an inner diameter of the bobbin 3. Meanwhile, the flanges 10b and 10c are formed so that an outer diameter thereof is substantially the same as an outer diameter of the magnetic ring 9.

The rotating shaft 2 is inserted into the hollow of the cylinder 10a of the fixing ring 10. The cylinder 10a is formed so that an inner diameter thereof is slightly larger than an outer diameter of the rotating shaft 2. A gap g is formed between the inner wall of the cylinder 10a and the rotating shaft 2 so that the torque sensor 1 does not come into contact with the rotating shaft 2. The torque sensor 1 is fixed to a fixed member such as a housing and does not rotate with rotation of the rotating shaft 2.

In the first embodiment, the fixing ring 10 is provided between the bobbin 3 with the first to fourth detection coils 4 to 7 wound thereon and the rotating shaft 2. Thus, the fixing ring 10 needs to be formed of a non-magnetic material which does not have an effect on a magnetic flux generated by the first to fourth detection coils 4 to 7. The fixing ring 10 is desirably formed of a material with oil resistance and heat resistance according to the use environment.

Although the configuration in which the bobbin 3 is fixed to the magnetic ring 9 using the fixing ring 10 has been described here, the structure of fixing the bobbin 3 to the magnetic ring 9 is not limited thereto. For example, the bobbin 3 and the magnetic ring 9 may be fixed to each other by covering with a mold resin.

Configurations of the Bobbin 3 and the First to Fourth Detection Coils 4 to 7

Figure 2:
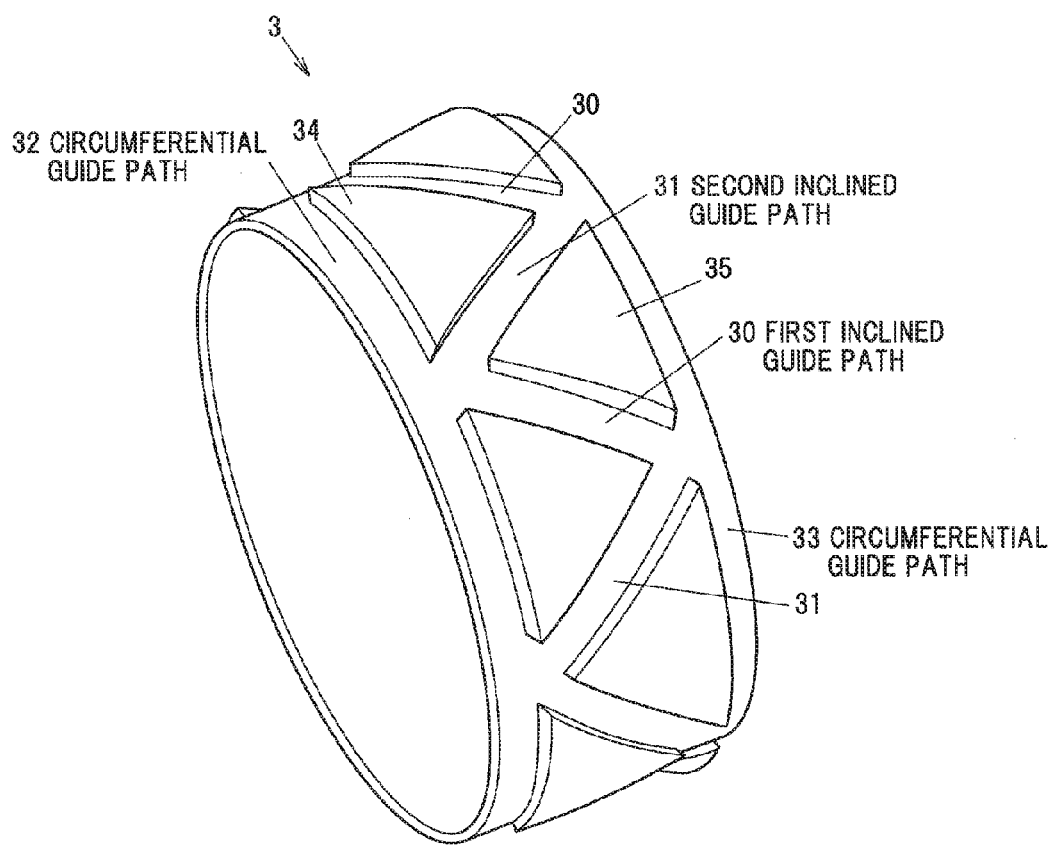
FIG. 2 is a perspective view showing a bobbin.

FIG. 2 is a perspective view showing the bobbin 3. As shown in FIGS. 1A to 2, the bobbin 3 has a hollow cylindrical shape overall. In addition, the bobbin 3 is formed of a resin and is provided coaxially with and at a distance from the rotating shaft 2.

Plural first inclined guide paths 30, plural second inclined guide paths 31, a pair of circumferential guide paths 32 and 33 are formed on the outer peripheral surface of the bobbin 3. The first inclined guide paths 30 are inclined at a predetermined angle relative to an axial direction of the rotating shaft 2, the second inclined guide paths 31 are inclined at a predetermined angle relative to the axial direction in a direction opposite to the first inclined guide paths 30 (but at the same angle as the first inclined guide paths 30), and the circumferential guide paths 32 and 33 are parallel to each other and couple the first inclined guide paths 30 to the second inclined guide paths 31 at both ends.

The first inclined guide paths 30 and the second inclined guide paths 31 are formed by providing grooves recessed in a radial direction of the bobbin 3. The pair of circumferential guide paths 32 and 33 are formed by providing level differences along the entire circumference of the bobbin 3 at end portions in the axial direction. Alternatively, the circumferential guide paths 32 and 33 may be formed by providing grooves. Each triangular raised portion 34 is formed by being surrounded by the first inclined guide path 30, the second inclined guide path 31 and the circumferential guide path 32, and each inverted triangular raised portion 35 is formed by being surrounded by the first inclined guide path 30, the second inclined guide path 31 and the circumferential guide path 33.

On the bobbin 3, the first inclined guide paths 30 are formed to be inclined at +45 degrees relative to the axial direction, and the second inclined guide paths 31 are formed to be inclined at −45 degrees relative to the axial direction. In the torque sensor 1, the first to fourth detection coils 4 to 7 are formed by winding the insulated wires 8 along the first and second inclined guide paths 30 and 31. Since variation in magnetic permeability when torque is applied to the rotating shaft 2 is the largest in directions of ±45 degrees relative to the axial direction, the first and second inclined guide paths 30 and 31 are inclined at ±45 degree relative to the axial direction to improve detection sensitivity.

The inclination angle of the first and second inclined guide paths 30 and 31 is not limited to ±45 degrees. However, sensitivity decreases when the inclination angle of the first and second inclined guide paths 30 and 31 is too large or too small. Therefore, the inclination angle of the first and second inclined guide paths 30 and 31 relative to the axial direction is desirably in a range of ±30 to 60 degrees.

In the first embodiment, six first inclined guide paths 30 are formed at equal intervals in a circumferential direction and six second inclined guide paths 31 are formed at equal intervals in the circumferential direction, so that a zig-zag groove on the whole is formed on the outer peripheral surface of the bobbin 3. However, the numbers of the first and second inclined guide paths 30 and 31 are not limited thereto and can be appropriately changed according to the outer diameter of the bobbin 3 or the outer diameter of the rotating shaft 2, etc.

In the embodiments, the first to fourth detection coils 4 to 7 are formed on the outer peripheral surface of the bobbin 3. Thus, the bobbin 3 need to be formed of a non-magnetic material which does not have an effect on a magnetic flux generated by the first to fourth detection coils 4 to 7. Meanwhile, when the torque sensor 1 is used in an environment in which the torque sensor 1 comes into contact with oil such as lubricant oil, it is necessary to use the bobbin 3 which is formed of an oil resistant material. Furthermore, when the torque sensor 1 is used in a high-temperature environment, it is desirable to use the bobbin 3 which is formed of a heat resistant material. In the embodiments, a resin is used to form the bobbin 3 and the fixing ring 10.

Furthermore, it is desirable to use the bobbin 3 having a linear expansion coefficient equivalent to that of copper (the insulated wire 8) so that the insulated wires 8 consisting mainly of copper are not broken by thermal expansion of the bobbin 3. In more detail, a resin used to form the bobbin 3 desirably has a linear expansion coefficient of within ±25% of the linear expansion coefficient of copper. Since the linear expansion coefficient of copper is $1.66 \times 10^{-5}$ to $1.68 \times 10^{-5}$/° C., a resin having a linear expansion coefficient of not less than $1.25 \times 10^{-5}$/° C. and not more than $2.1 \times 10^{-5}$/° C. is desirably used to form the bobbin 3.

Examples of resins satisfying such conditions include a polyphthalamide resin (PPA), a polyether ether ketone resin (PEEK) and a polyphenylene sulfide resin (PPS), etc. Of those, PPA and PPS have a linear expansion coefficient of $1.3 \times 10^{-5}$ to $1.5 \times 10^{-5}$/° C. It is also possible to adjust the linear expansion coefficient by adding glass fibers to a resin used to form the bobbin 3. By using the bobbin 3 formed of such resins, it is possible to realize the torque sensor 1 which is excellent in oil resistance and heat resistance and has high reliability.

The first detection coil 4 and the fourth detection coil 7 are formed by winding the insulated wires 8 around the bobbin 3 along the first inclined guide paths 30 and the circumferential guide paths 32, 33. The second detection coil 5 and the third detection coil 6 are formed by winding the insulated wires 8 around the bobbin 3 along the second inclined guide paths 31 and the circumferential guide paths 32, 33. Each of the first detection coil 4, the second detection coil 5, the third detection coil 6 and the fourth detection coil 7 forms plural layers which are not continuously laminated. This reduces a difference in inductance and resistance between the first to fourth detection coils 4 to 7 as compared to when each of the first detection coil 4, the second detection coil 5, the third detection coil 6 and the fourth detection coil 7 forms a single layer, and it is thereby possible to prevent offset voltage generation.

When winding the insulated wires 8 around the bobbin 3, the bobbin 3 is fixed to a jig. The insulated wire 8 preferably used here is an insulated wire in which an insulation layer excellent in oil resistance and heat resistance is provided around a conductor formed of, e.g., copper, or copper plated with nickel, etc. The insulation layer of the insulated wire 8 can be formed of, e.g., polyester, polyimide or polyamide-imide. The outer diameter of the insulated wire 8 is, e.g., 0.12 mm but can be appropriately changed.

Laminated Structure of the First to Fourth Detection Coils 4 to 7

The invention is characterized in the laminated structure in which each of the first to fourth detection coils forms plural layers laminated on the outer surface of the bobbin 3, such that the layers of the second detection coil 5 and the third detection coil 6 are interposed between the plural layers of the first detection coil 4, the layers of the first detection coil 4 and the fourth detection coil 7 are interposed between the plural layers of the second detection coil 5, the layers of the first detection coil 4 and the fourth detection coil 7 are interposed between the plural layers of the third detection coil 6, and the layers of the second detection coil 5 and the third detection coil 6 are interposed between the plural layers of the fourth detection coil 7. Next, a method of winding the first to fourth detection coils 4 to 7 to realize such laminated structure will be described based on the specific example.

Figure 3A:
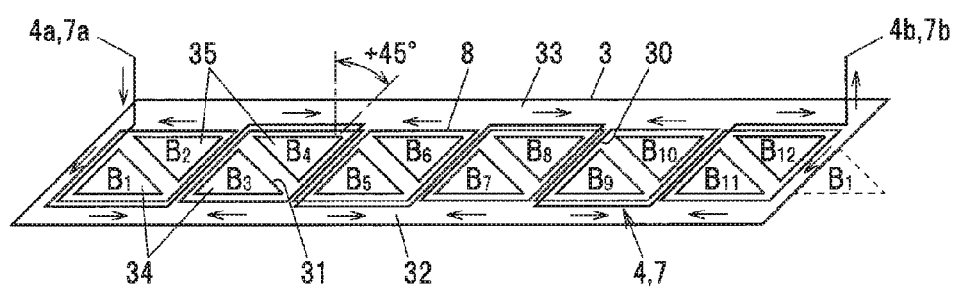
Figure 3B:
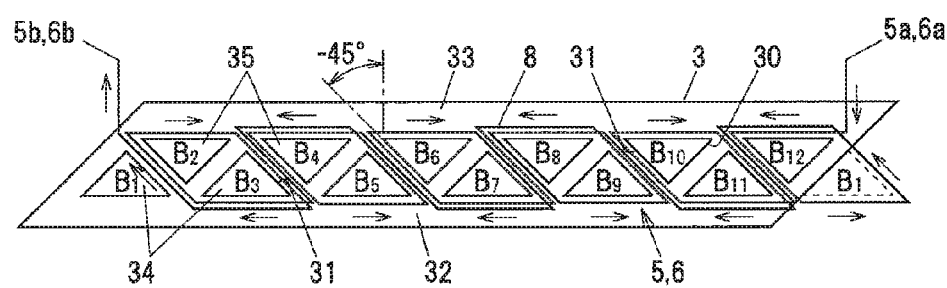

FIGS. 3A and 3B are schematic exploded plan views showing the bobbin 3. The right and left edges in the drawing are actually connected. In FIG. 3A, the first detection coil 4 and the fourth detection coil 7 are illustrated by one line. In FIG. 3B, the second detection coil 5 and the third detection coil 6 are illustrated by one line.

In FIGS. 3A and 3B, twelve raised portions 34 and 35 arranged in the circumferential direction of the bobbin 3 are denoted by $B_1$ to $B_{12}$. In FIG. 3A, an input and an output of the first detection coil 4 for one layer are respectively denoted by 4a and 4b, and an input and an output of the fourth detection coil 7 for one layer are respectively denoted by 7a and 7b. In FIG. 3B, an input and an output of the second detection coil 5 for one layer are respectively denoted by 5a and 5b, and an input and an output of the third detection coil 6 for one layer are respectively denoted by 6a and 6b. In addition, the arrows in FIGS. 3A and 3B indicate winding directions of the insulated wires 8.

(1) Process of Winding the First Detection Coil 4 and the Fourth Detection Coil 7

Two insulated wires 8 respectively constituting the first detection coil 4 and the fourth detection coil 7 are wound along the first inclined guide paths 30 and the circumferential guide paths 32, 33. In detail, firstly, as shown in FIG. 3A, the two insulated wires 8 constituting the first detection coil 4 and the fourth detection coil 7 are bundled and wound once around the raised portions 34 and 35 denoted by $B_1$ and $B_2$, then wound once around the raised portions 34 and 35 denoted by $B_3$ and $B_4$, then wound once around the raised portions 34 and 35 denoted by $B_5$ and $B_6$, then wound once around the raised portions 34 and 35 denoted by $B_7$ and $B_8$, then wound once around the raised portions 34 and 35 denoted by $B_9$ and $B_{10}$ and then wound once around the raised portions 34 and 35 denoted by $B_{11}$ and $B_{12}$, so that a closed parallelogram is formed around each pair of raised portions 34 and 35. Through the above process, one round (one turn) of the two insulated wires 8 constituting the first detection coil 4 and the fourth detection coil 7 is completed.

(2) Process of Winding the Second Detection Coil 5 and the Third Detection Coil 6

Two insulated wires 8 respectively constituting the second detection coil 5 and the third detection coil 6 are wound along the second inclined guide paths 31 and the circumferential guide paths 32, 33. In detail, as shown in FIG. 3B, the two insulated wires 8 constituting the second detection coil 5 and the third detection coil 6 are bundled and wound once around the raised portions 34 and 35 denoted by $B_1$ and $B_{12}$, then wound once around the raised portions 34 and 35 denoted by $B_{11}$ and $B_{10}$, then wound once around the raised portions 34 and 35 denoted by $B_9$ and $B_8$, then wound once around the raised portions 34 and 35 denoted by $B_7$ and $B_6$, then wound once around the raised portions 34 and 35 denoted by $B_5$ and $B_4$ and then wound once around the raised portions 34 and 35 denoted by $B_3$ and $B_2$, so that a closed parallelogram is formed around each pair of raised portions 34 and 35. Through the above process, one round (one turn) of the two insulated wires 8 constituting the second detection coil 5 and the third detection coil 6 is completed.

After that, a set of the process of winding the two insulated wires 8 constituting the first detection coil 4 and the fourth detection coil 7 around the raised portions 34 and 35 denoted by $B_1$ to $B_{12}$ on the bobbin 3 and the subsequent process of winding the two insulated wires 8 constituting second detection coil 5 and the third detection coil 6 in the same manner as described above is repeated until reaching the desired number of turns (2×n turns). Here, n is a natural number and is, e.g., 10 to 20. When repeating the winding process, the output 4b of the first detection coil 4 in the previous turn becomes the input 4a in the next turn. The same applies to the second to fourth detection coils 5 to 7.

Alternatively, the two insulated wires 8 constituting second detection coil 5 and the third detection coil 6 may be wound from the opposite side, started with the raised portions 34 and 35 denoted by $B_2$ and $B_3$ and ended with the raised portions 34 and 35 denoted by $B_{12}$ and $B_1$. In this regard, however, the positions of the inputs 5a, 6a and the outputs 5b, 6b do not change.

The method of winding the insulated wires 8 is not limited to that shown in the FIGS. 3A and 3B. Other winding methods will be described later in the second and third embodiment. The insulated wires 8 are generally wound using a dedicated winding machine and, in view of facilitating the process of winding the insulated wires 8, it is more desirable to use the method described in FIGS. 3A and 3B. That is, it is possible to improve productivity by winding the insulated wires 8 using the method described in FIGS. 3A and 3B.

Configuration of Measurement Portion

Figure 4:
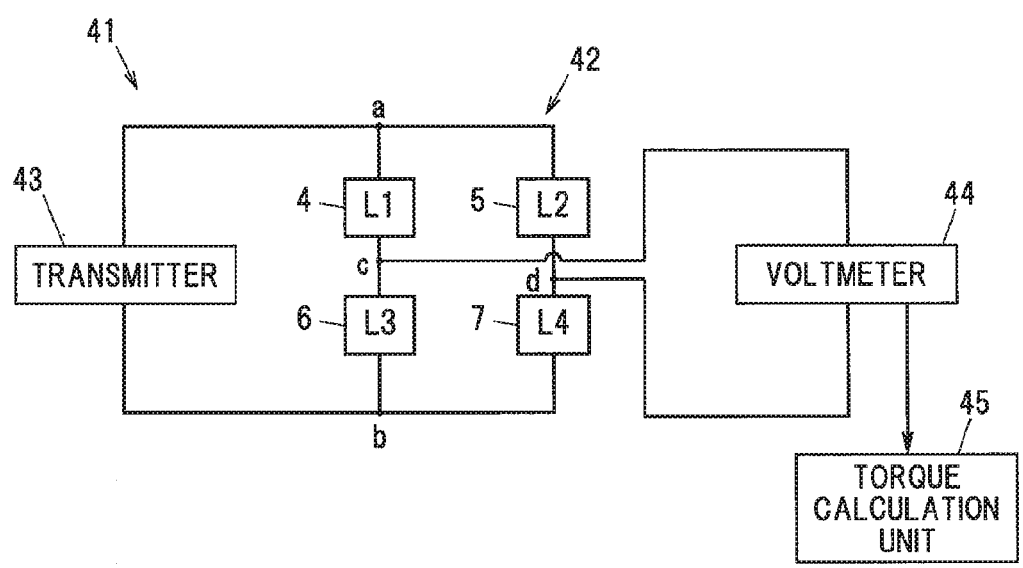
FIG. 4 is a schematic diagram illustrating a measurement portion.

FIG. 4 is a circuit diagram illustrating a configuration example of a measurement portion 41 which measures torque applied to the rotating shaft 2 based on a detection signal of the torque sensor 1. The measurement portion 41 detects variation in inductances of the first to fourth detection coils 4 to 7 and thereby measures torque applied to the rotating shaft 2.

Hereinafter, inductance of the first detection coil 4 is denoted by L1, inductance of the second detection coil 5 is denoted by L2, inductance of the third detection coil 6 is denoted by L3, and inductance of the fourth detection coil 7 is denoted by L4.

The measurement portion 41 is provided with a bridge circuit 42, a transmitter 43, a voltage measurement circuit 44 and a torque calculation unit 45. The bridge circuit 42 is formed by annularly connecting the first detection coil 4, the second detection coil 5, the fourth detection coil 7 and the third detection coil 6 in this order. The transmitter 43 applies AC voltage to a junction a between the first detection coil 4 and the second detection coil 5 and to a junction b between the third detection coil 6 and the fourth detection coil 7. The voltage measurement circuit 44 detects voltage at a junction c between the first detection coil 4 and the third detection coil 6 and at a junction d between the second detection coil 5 and the fourth detection coil 7. The torque calculation unit 45 calculates torque applied to the rotating shaft 2 based on the voltages measured by the voltage measurement circuit 44. The bridge circuit 42 is configured such that the first detection coil 4 and the fourth detection coil 7 are arranged on a pair of opposite sides and the second detection coil 5 and the third detection coil 6 are arranged on another pair of opposite sides.

In the measurement portion 41, when torque is not applied to the rotating shaft 2, the inductances L1 to L4 of the first to fourth detection coils 4 to 7 are equal to each other and voltage detected by the voltage measurement circuit 44 is substantially zero.

When torque is applied to the rotating shaft 2, magnetic permeability in a direction of +45 degrees relative to the axial direction decreases (or increases) and magnetic permeability in a direction of −45 degrees relative to the axial direction increases (or decreases). Thus, when torque is applied to the rotating shaft 2 in a state in which AC voltage is applied from the transmitter 43, inductances of the first detection coil 4 and the fourth detection coil 7 decrease (or increase) and inductances of the second detection coil 5 and the third detection coil 6 increase (or decrease). As a result, voltage detected by the voltage measurement circuit 44 varies. Based on the variation in voltage, the torque calculation unit 45 calculates torque applied to the rotating shaft 2.

Since the configuration of the first and fourth detection coils 4 and 7 is entirely the same as the configuration of the second and third detection coils 5 and 6 except the winding direction, an effect on inductances of the first to fourth detection coils 4 to 7 can be cancelled out by using the bridge circuit 42 as shown in FIG. 4 and it is thus possible to accurately detect torque applied to the rotating shaft 2. In addition, in the torque sensor 1, when the inductances of the first detection coil 4 and the fourth detection coil 7 increase (or decrease), the inductances of the second detection coil 5 and the third detection coil 6 always decrease (or increase). Therefore, it is possible to further improve detection sensitivity by using the bridge circuit 42 as shown in FIG. 4.

Functions and Effects of the First Embodiment

As described above, in the torque sensor 1 of the first embodiment, the first layer is formed of the first detection coil 4 and the fourth detection coil 7, the second layer is formed of the second detection coil 5 and the third detection coil 6, and the first layers and the second layers are alternately laminated on the outer surface of the bobbin 3 so that the plural layers of each of the first to fourth detection coils 4 to 7 are not continuously laminated. This reduces a difference in inductance and resistance between the first to fourth detection coils 4 to 7 as compared to when each of the first to fourth detection coils 4 to 7 forms a single layer. As a result, variation in offset voltage due to temperature change is reduced and temperature characteristics are improved.

Second Embodiment

FIGS. 5A to 5D are schematic exploded plan views showing the bobbin 3 in the second embodiment of the invention. In the second embodiment, the method of winding the first to fourth detection coils 4 to 7 is different from that in the first embodiment. The feature different from the first embodiment will be mainly described below.

(1) Process of Winding the First Detection Coil 4

Figure 5A:
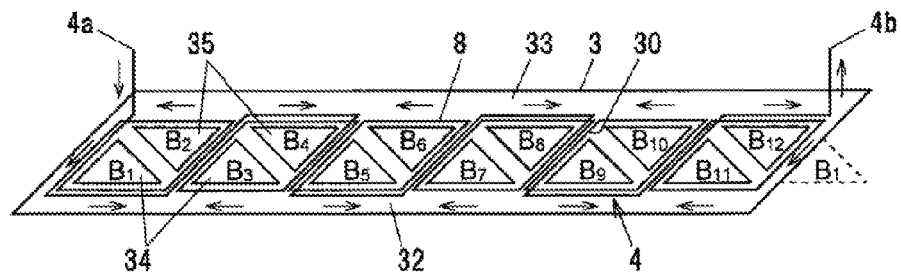

Firstly, as shown in FIG. 5A, the insulated wire 8 constituting the first detection coil 4 is wound once around the raised portions 34 and 35 denoted by $B_1$ and $B_2$, then wound once around the raised portions 34 and 35 denoted by $B_3$ and $B_4$, then wound once around the raised portions 34 and 35 denoted by $B_5$ and $B_6$, then wound once around the raised portions 34 and 35 denoted by $B_7$ and $B_8$, then wound once around the raised portions 34 and 35 denoted by $B_9$ and $B_{10}$ and then wound once around the raised portions 34 and 35 denoted by $B_{11}$ and $B_{12}$, so that a closed parallelogram is formed around each pair of raised portions 34 and 35. Through the above process, one round (one turn) of the first detection coil 4 is completed. The insulated wire 8 constituting the first detection coil 4 is wound along the first inclined guide paths 30 and the circumferential guide paths 32, 33.

(2) Process of Winding the Second Detection Coil 5

Figure 5B:
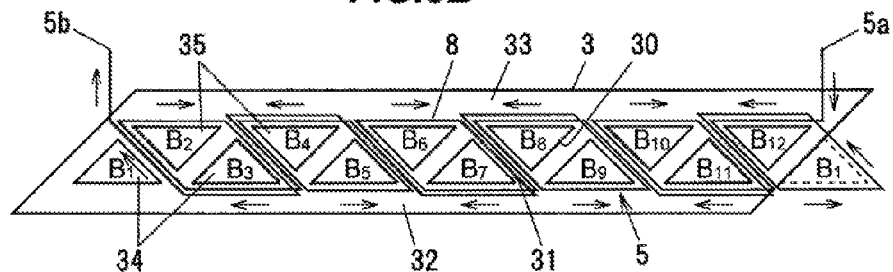

Next, as shown in FIG. 5B, the insulated wire 8 constituting the second detection coil 5 is wound once around the raised portions 34 and 35 denoted by $B_1$ and $B_{12}$, then wound once around the raised portions 34 and 35 denoted by $B_{11}$ and $B_{10}$, then wound once around the raised portions 34 and 35 denoted by $B_9$ and $B_8$, then wound once around the raised portions 34 and 35 denoted by $B_7$ and $B_6$, then wound once around the raised portions 34 and 35 denoted by $B_5$ and $B_4$ and then wound once around the raised portions 34 and 35 denoted by $B_3$ and $B_2$, so that a closed parallelogram is formed around each pair of raised portions 34 and 35. Through the above process, one round (one turn) of the second detection coil 5 is completed. The insulated wire 8 constituting the second detection coil 5 is wound along the second inclined guide paths 31 and the circumferential guide paths 32, 33.

(3) Process of Winding the Third Detection Coil 6

Figure 5C:
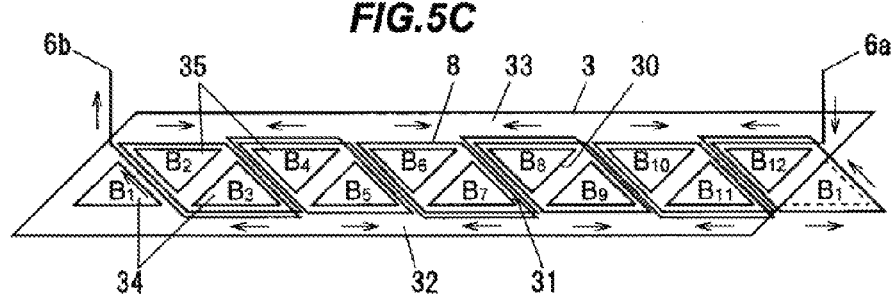

Next, as shown in FIG. 5C, the third detection coil 6 is wound from the raised portions 34 and 35 denoted by $B_1$ and $B_{12}$ to the raised portions 34 and 35 denoted by $B_3$ and $B_2$, in the same manner as the second detection coil 5. Through the above process, one round (one turn) of the third detection coil 6 is completed. The insulated wire 8 constituting the third detection coil 6 is wound along the second inclined guide paths 31 and the circumferential guide paths 32, 33.

(4) Process of Winding the Fourth Detection Coil 7

Figure 5D:
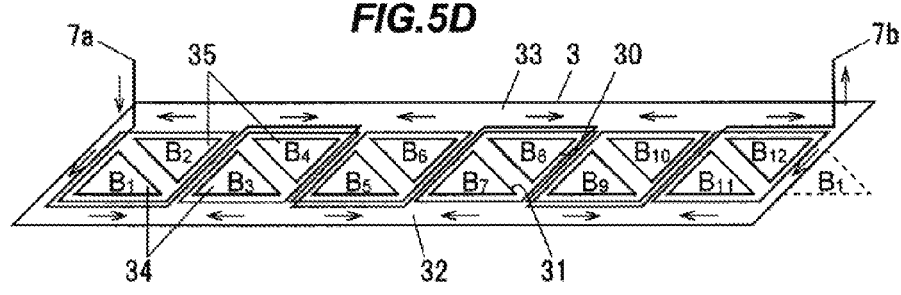

Next, as shown in FIG. 5D, the fourth detection coil 7 is wound from the raised portions 34 and 35 denoted by $B_1$ and $B_2$ to the raised portions 34 and 35 denoted by $B_{11}$ and $B_{12}$, in the same manner as the first detection coil 4. Through the above process, one round (one turn) of the fourth detection coil 7 is completed. The insulated wire 8 constituting the fourth detection coil 7 is wound along the first inclined guide paths 30 and the circumferential guide paths 32, 33.

After that, a set of the processes of winding the insulated wires 8 constituting the first to fourth detection coils 4 to 7 around the raised portions 34 and 35 denoted by $B_1$ to $B_{12}$ on the bobbin 3 in the same manner as described above is repeated until reaching the desired number of turns (4×n turns).

Functions and Effects of the Second Embodiment

As described above, in the torque sensor 1 of the second embodiment, the first layer is formed of the first detection coil 4, the second layer is formed of the second detection coil 5, the third layer is formed of the third detection coil 6, the fourth layer is formed of the fourth detection coil 7, and the first to fourth layers are laminated in this order on the outer surface of the bobbin 3 so that the plural layers of each of the first to fourth detection coils 4 to 7 are not continuously laminated. This reduces a difference in inductance and resistance between the first to fourth detection coils 4 to 7 as compared to when each of the first to fourth detection coils 4 to 7 forms a single layer. As a result, variation in offset voltage due to temperature change is reduced and temperature characteristics are improved.

Third Embodiment

Figure 6A:
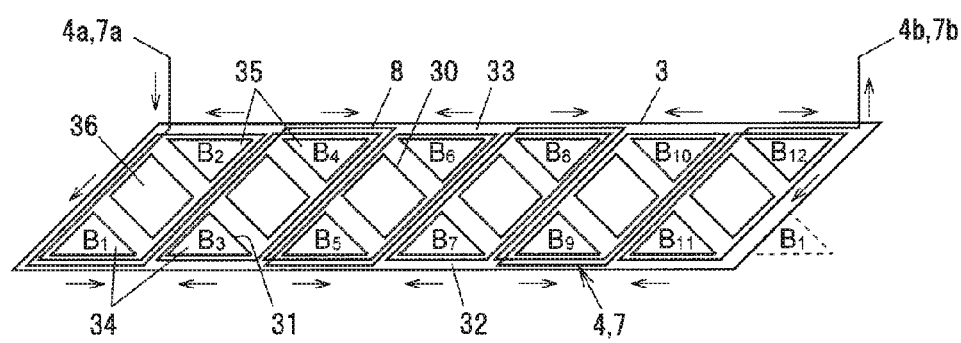
Figure 6B:
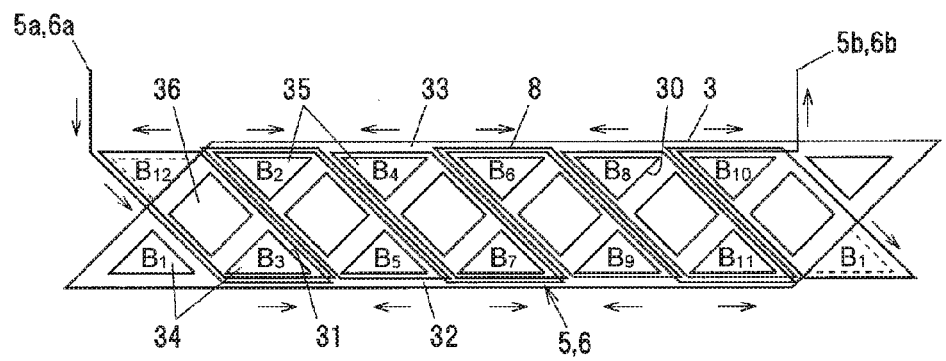

FIGS. 6A and 6B are schematic exploded plan views showing the bobbin 3 in the third embodiment of the invention. In the third embodiment, the bobbin 3 and the method of winding the first to fourth detection coils 4 to 7 are different from those in the first embodiment. The features different from the first embodiment will be mainly described below.

On the bobbin 3 of the third embodiment, a square raised portion 36 is arranged between each pair of raised portions 34 and 35.

(1) Process of Winding First Detection Coil 4 and Fourth Detection Coil 7

Firstly, as shown in FIG. 6A, the two insulated wires 8 constituting the first detection coil 4 and the fourth detection coil 7 are bundled and wound once around the raised portions 34 and 35 denoted by $B_1$ and $B_2$, then wound once around the raised portions 34 and 35 denoted by $B_3$ and $B_4$, then wound once around the raised portions 34 and 35 denoted by $B_5$ and $B_6$, then wound once around the raised portions 34 and 35 denoted by $B_7$ and $B_8$, then wound once around the raised portions 34 and 35 denoted by $B_9$ and $B_{10}$ and then wound once around the raised portions 34 and 35 denoted by $B_{11}$ and $B_{12}$, so that a closed parallelogram is formed around each pair of raised portions 34 and 35. Meanwhile, since the square raised portions 36 are arranged between the raised portions 34 and 35 as described above, each raised portion 36, together with a pair of raised portions 34 and 35, is surrounded by the insulated wires 8 wound around the raised portions 34 and 35.

Through the above process, one round (one turn) of the two insulated wires 8 constituting the first detection coil 4 and the fourth detection coil 7 is completed. The two insulated wires 8 constituting the first detection coil 4 and the fourth detection coil 7 are wound along the first inclined guide paths 30 and the circumferential guide paths 32, 33.

(2) Process of Winding Second Detection Coil 5 and Third Detection Coil 6

Next, as shown in FIG. 6B, the two insulated wires 8 constituting the second detection coil 5 and the third detection coil 6 are bundled and wound once around the raised portions 34 and 35 denoted by $B_{12}$ and $B_3$, then wound once around the raised portions 34 and 35 denoted by $B_2$ and $B_5$, then wound once around the raised portions 34 and 35 denoted by $B_4$ and $B_7$, then wound once around the raised portions 34 and 35 denoted by $B_6$ and $B_9$, then wound once around the raised portions 34 and 35 denoted by $B_8$ and $B_{11}$ and then wound once around the raised portions 34 and 35 denoted by $B_{10}$ and $B_1$, so that a closed parallelogram is formed around each pair of raised portions 34 and 35. Through the above process, one round (one turn) of the two insulated wires 8 constituting the second detection coil 5 and the third detection coil 6 is completed. The two insulated wires 8 constituting the second detection coil 5 and the third detection coil 6 are wound along the second inclined guide paths 31 and the circumferential guide paths 32, 33.

After that, a set of the process of winding the two insulated wires 8 constituting the first detection coil 4 and the fourth detection coil 7 around the raised portions 34 and 35 denoted by $B_1$ to $B_{12}$ on the bobbin 3 and the subsequent process of winding the two insulated wires 8 constituting second detection coil 5 and the third detection coil 6 in the same manner as described above is repeated until reaching the desired number of turns (2×n turns).

Functions and Effects of the Third Embodiment

As described above, in the torque sensor 1 of the third embodiment, the first layer is formed of the first detection coil 4 and the fourth detection coil 7, the second layer is formed of the second detection coil 5 and the third detection coil 6, and the first layers and the second layers are alternately laminated on the outer surface of the bobbin 3 so that the plural layers of each of the first to fourth detection coils 4 to 7 are not continuously laminated, in the same manner as the first embodiment. This reduces a difference in inductance and resistance between the first to fourth detection coils 4 to 7, and as a result, variation in offset voltage due to temperature change is reduced and temperature characteristics are improved, in the same manner as the first embodiment.

Alternatively, the bobbin 3 having the square raised portions 36 in the third embodiment may be used when, e.g., the layers of the first detection coil 4, the second detection coil 5, the third detection coil 6 and the fourth detection coil 7 are sequentially laminated as in the second embodiment. The same functions and effects are obtained also in this case.

Summary of the Embodiments

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A torque sensor (1) for being attached around a magnetostrictive rotating shaft (2) to measure torque applied to the rotating shaft (2), the torque sensor (1) comprising: a non-magnetic bobbin (3) that is provided coaxially with and at a distance from the rotating shaft (2), is formed into a hollow cylindrical shape, and comprises a plurality of first inclined guide paths (30) and a plurality of second inclined guide paths (31) on the outer peripheral surface, the first inclined guide paths (30) being inclined at a predetermined angle relative to an axial direction and the second inclined guide paths (31) being inclined at the predetermined angle relative to the axial direction in a direction opposite to the first inclined guide paths (30); first and fourth detection coils (4 and 7) formed by winding insulated wires (8) around the bobbin (3) along the first inclined guide paths (30); and second and third detection coils (5 and 6) formed by winding insulated wires (8) around the bobbin (3) along the second inclined guide paths (31), wherein the first to fourth detection coils (4 to 7) each form a plurality of layers laminated on the outer surface of the bobbin (3), a bridge circuit (4) is formed by annularly connecting the first detection coil (4), the second detection coil (5), the fourth detection coil (7) and the third detection coil (6) in this order, the layers of the second and third detection coils (5 and 6) are interposed between the plurality of layers of the first detection coil (4), the layers of the first and fourth detection coils (4 and 7) are interposed between the plurality of layers of the second detection coil (5), the layers of the first and fourth detection coils (4 and 7) are interposed between the plurality of layers of the third detection coil (6), and the layers of the second and third detection coils (5 and 6) are interposed between the plurality of layers of the fourth detection coil (7).

[2] The torque sensor (1) defined by [1], wherein first and fourth detection coils (4 and 7) form a same layer, and the second and third detection coils (5 and 6) form a same layer.

[3] The torque sensor (1) defined by [1], wherein the layer of the first detection coil (4), the layer of the second detection coil (5), the layer of the third detection coil (6) and the layer of the fourth detection coil (7) are sequentially laminated.

[4] The torque sensor (1) defined by any one of [1] to [3], further comprising a magnetic ring (9) comprising a hollow cylindrical magnetic material and provided around the bobbin (3).

[5] The torque sensor (1) defined by any one of [1] to [4], wherein the bobbin (3) comprises a polyphthalamide resin, a polyether ether ketone resin or a polyphenylene sulfide resin.

Although the embodiments of the invention have been described, the invention according to claims is not to be limited to the embodiments. Further, please note that all combinations of the features described in the embodiments are not necessary to solve the problem of the invention.

The invention can be appropriately modified and implemented without departing from the gist of the invention. For example, although the each of layers laminated on the outer surface of the bobbin 3 is formed of one round (one turn) of the insulated wire(s) 8 in the first to third embodiments, it is not limited thereto. Each of the layers of the first to fourth detection coils 4 to 7 may be formed of plural rounds (plural turns).

What is claimed is:

1. A torque sensor for being attached around a magnetostrictive rotating shaft to measure torque applied to the rotating shaft, the torque sensor comprising:
a non-magnetic bobbin that is provided coaxially with and at a distance from the rotating shaft, is formed into a hollow cylindrical shape, and comprises a plurality of first inclined guide paths and a plurality of second inclined guide paths on the outer peripheral surface, the first inclined guide paths being inclined at a predetermined angle relative to an axial direction and the second inclined guide paths being inclined at the predetermined angle relative to the axial direction in a direction opposite to the first inclined guide paths;
first and fourth detection coils formed by winding insulated wires around the bobbin along the first inclined guide paths; and
second and third detection coils formed by winding insulated wires around the bobbin along the second inclined guide paths,
wherein the first to fourth detection coils each form a plurality of layers laminated along a radial direction of the bobbin, and a bridge circuit is formed by annularly connecting the first detection coil, the second detection coil, the fourth detection coil and the third detection coil in this order,
wherein the layers of the second and third detection coils are interposed between the plurality of layers of the first detection coil, wherein the layers of the first and fourth detection coils are interposed between the plurality of layers of the second detection coil, wherein the layers of the first and fourth detection coils are interposed between the plurality of layers of the third detection coil, and wherein the layers of the second and third detection coils are interposed between the plurality of layers of the fourth detection coil.

2. The torque sensor according to claim 1, wherein the first and fourth detection coils are formed in a same layer, and the second and third detection coils are formed in a same layer.

3. The torque sensor according to claim 1, wherein the layer of the first detection coil, the layer of the second detection coil, the layer of the third detection coil and the layer of the fourth detection coil are sequentially laminated.

4. The torque sensor according to claim 1, further comprising a magnetic ring comprising a hollow cylindrical magnetic material and provided around the bobbin.

5. The torque sensor according to claim 1, wherein the bobbin comprises a polyphthalamide resin, a polyether ether ketone resin or a polyphenylene sulfide resin.

6. The torque sensor according to claim 1, wherein a material used to form the bobbin comprises a linear expansion coefficient of within ±25% of the linear expansion of copper.

7. The torque sensor according to claim 1, wherein the bobbin further includes circumferential guide paths.

8. The torque sensor according to claim 7, wherein each of the detection coils includes inclined winding portions disposed in the inclined guide paths and circumferential winding portions disposed in the circumferential guide paths.

* * * * *